United States Patent [19]

Arai et al.

[11] Patent Number: 4,459,611
[45] Date of Patent: Jul. 10, 1984

[54] IMAGE CONVERSION SYSTEM

[75] Inventors: Yoshio Arai; Hiroyuki Kataoka; Isao Suzuki; Shozo Yokota, all of Kanagawa, Japan

[73] Assignee: Fuji Xerox Co., Ltd., Tokyo, Japan

[21] Appl. No.: 325,476

[22] Filed: Nov. 27, 1981

Related U.S. Application Data

[63] Continuation of Ser. No. 070,463, Aug. 28, 1979, abandoned.

[30] Foreign Application Priority Data

Aug. 28, 1978 [JP] Japan .................................. 53-104548
Aug. 28, 1978 [JP] Japan .................................. 53-104549
Aug. 28, 1978 [JP] Japan .................................. 53-104550

[51] Int. Cl.$^3$ .......................... H04N 7/16; H04N 1/14
[52] U.S. Cl. .................................. 358/119; 358/259; 358/260; 358/263
[58] Field of Search .............. 358/114, 119, 259, 260, 358/263

[56] References Cited

U.S. PATENT DOCUMENTS

| | | | |
|---|---|---|---|
| 2,437,255 | 3/1948 | Hogan et al. | 358/259 |
| 2,940,005 | 6/1960 | Toulon | 358/119 |
| 3,830,964 | 8/1974 | Spencer | 358/260 |
| 3,958,077 | 5/1976 | Ross et al. | 358/119 |
| 4,070,693 | 1/1978 | Shutterly | 358/123 |
| 4,134,133 | 1/1979 | Teramura et al. | 358/260 |

Primary Examiner—S. C. Buczinski
Attorney, Agent, or Firm—Sughrue, Mion, Zinn, Macpeak and Seas

[57] ABSTRACT

The image converting system including an image input step or apparatus for converting an original document information into electric image signals an inputting them, an image processing step or apparatus for processing the original document information supplied by the image input step in a predetermined process or order to provide converted image signals different from the original image, and a recording step or apparatus for recording the image on a recording medium in accordance with the image signals derived from the image processing step thereby recording a pattern materially different from the original image on the recording medium or displaying same on an indicator. The converted image signals may be obtained by the use of a coding or scrambling signal and an Exclusive OR operation. Line shifting may be employed. The original image may also be divided into a number of grid components and mixed in accordance with the coding rule.

28 Claims, 24 Drawing Figures

(A) and (B) — matrix reordering diagram

IMAGE CONVERSION SYSTEM

This is a continuation of application Ser. No. 70,463, filed Aug. 28, 1979 (now abandoned).

BACKGROUND OF THE INVENTION

This invention relates to an image converter and, more particularly, to an image converting apparatus for reading an original image for each picture element as electronic signals in a manner well known in the art, the electronic signals being subjected to a logical operation to record the original image in a completely different pattern.

In accordance with the present invention, it is possible to convert a normal original document image into a coded image, quite different from the original document image and having no visual meaning. Conversely, it is possible to restore the coded or converted image into the original document image.

Coding systems for replacing the order of the letters and characters on an original document are well known in the communication art. Such coding systems include scramble communication systems for facsimile transmission and secret communication systems for voice transmission. Such coding systems are similar in their objects to the image converter of the present invention, but are quite different in structure and the method of operation. Also, such scramble and secret communication reading them again to restore them.

Conventional methods and apparatus for coding and printing letters on an original document and also for restoring them again have their usefulness limited in specialized applications, particularly such as for coding bank check signatures and character pictures and printing them in unreadable and undecipherable form. The coded signatures and pictures are rendered visible by viewing them through a special device upon restoring them for confirmation. Such conventional coding and encoding systems are of the fixed type including an optical subsystem such as a lenticular lens or an optical fiber bundle and can handle only small-sized original documents.

Another system is also well known in the art in which the coded information for office computer systems is recorded on a paper tape, magnetic tape, flexible disc, or the like for easy transport and custody. However, such a conventional system has many disadvantages:

(1) Systems using an optical fiber bundle or optical means cannot immediately convert a document for generating a print output.

(2) The above systems cannot restore the converted document for generating a print output.

(3) The above systems are so simple in conversion that other persons can readily restore the coded image.

(4) The above systems are of the fixed conversion type and thus cannot be used for long time.

(5) Systems using paper tapes as converted image recording media are low in information density and are bulky.

(6) Systems using magnetic tapes as converted image recording mediums are inconvenient in transport and custody since there is no one-to-one correspondence between the original document and the recording medium.

(7) Since magnetic tapes are not visible media, a careful system is required to prevent mistakes upon transport and custody.

SUMMARY OF THE INVENTION

Therefore, it is an object of the present invention to provide a novel image converter which is free from the disadvantages involved in the conventional systems.

Another object of the present invention is to provide an improved image converter.

A further object of this invention is to provide a method of image conversion that is accurate and fast.

Yet another object of this invention is to provide a method of image conversion that is flexible in allowing restoration of the converted document to its original form.

An important object of this invention is to provide a method and apparatus of image conversion that offers a high degree of security of encoding such that the converted image cannot be deciphered and the coding rule cannot be ascertained by study of the converted image.

In accordance with this invention ciphering (coding) of the original image data can be accomplished by breaking down the image into a number of elements forming a grid or by line scan shifting. Phase shifting or using a coded rule or scramble signal provide techniques of data transformation.

The image converter of the present invention includes image input means for converting original document information into electric image signals in a manner well known in the art and inputting it. An image processor processes the optical document information supplied by the image input means in a predetermined process or order to provide converted image signals different from the original image. A recorder records the image on a recording medium in accordance with the image signals derived from the image processor thereby recording a pattern quite different from the original image on the recording medium or displaying same on an indicator such as CRT. By such construction, an image converting (coding) device is provided which is free from the drawbacks involved in the prior art, conventional devices.

The present invention will now be described in more detail with reference to the accompanying drawings and the description of the preferred embodiments.

DESCRIPTION OF THE PREFERRED EMBODIMENT

Figure 1:
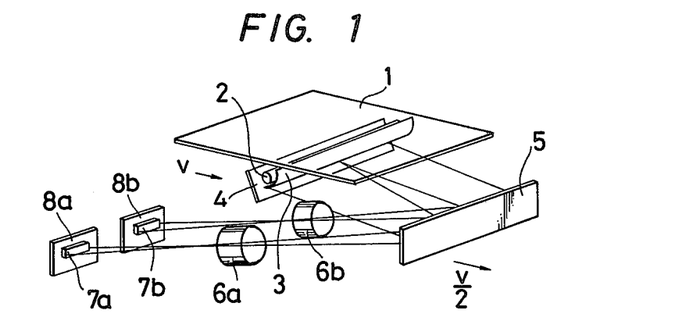
FIG. 1 is a perspective view of an apparatus for converting an original image into electric signals.
Figure 2:
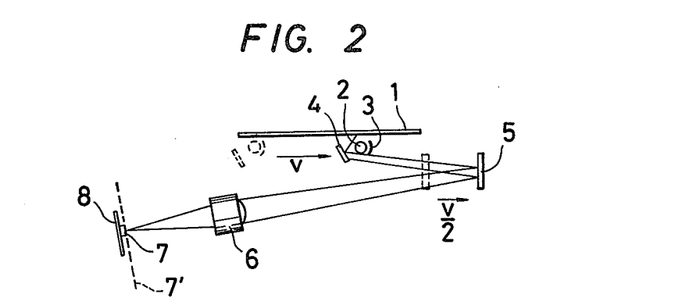
FIG. 2 is a side view of the apparatus.

FIGS. 1 and 2 illustrate the detailed construction of an example of means for converting an original document image information into electric signals (hereinafter referred namely to as the read-out section) which per se is known in the art. The original document (not shown) placed on a platen glass 1 has its part exposed to light by means of exposure means including a lamp 2 and a reflection plate 3. A part of the reflected light from the original document is focused through mirrors 4 and 5 and lenses 6a and 6b on the light receiving surface 7 of photo-diode arrays 7a and 7b. The exposure means comprising the lamp 2, the reflection plate 3 and the mirror 4 are moved as a unit in the direction indicated by the arrow at a predetermined speed v, while the mirror 5 is moved simultaneously in the same direction at a speed v/2.

Assuming that the magnification of the image focused on the light receiving surfaces 7 of the photo-diode arrays 7a and 7b is 1/n, the reduced image of the original document moves on the light receiving surfaces 7 at a speed v/n. Thus, the image information of the original document can be sequentially converted into electric signals by supplying signals to a number of photoelectric conversion elements (photo-diodes) constituting the photo-diode arrays simultaneously with movement of the reduced image for self-running. In FIGS. 1 and 2 arrangement, two photo-diode arrays 7a and 7b and two corresponding lenses 6a and 6b are provided to permit them to divide the original document into two parts to restrict the ranges of the photo-diode arrays 7a and 7b reading out in order to obtain necessary resolving power. The number of these elements may be determined in accordance with system requirements. Support members 8a and 8b are used for supporting the photo-diode arrays 7a and 7b. A circuit for driving the photo-diode array may be provided on each support member 8.

Figure 3:
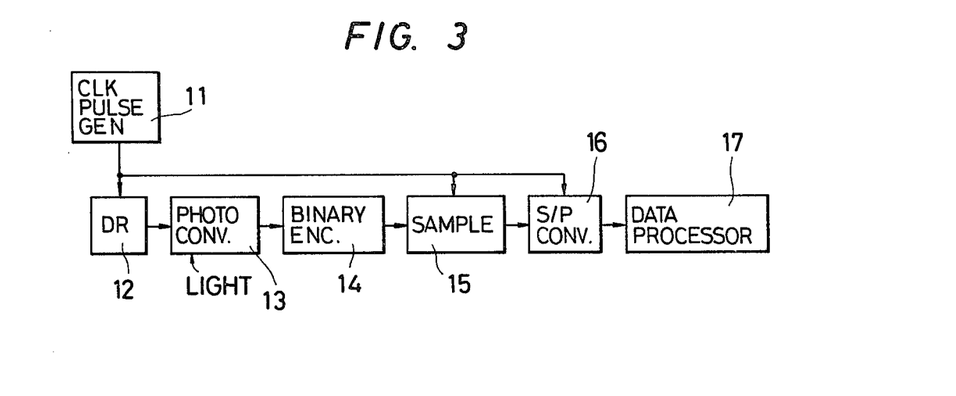
FIG. 3 is a block diagram showing an example of an original image to electric signal converter circuit.

FIG. 3 is a block diagram showing a circuit for converting an original document image information into electric signals. The circuit including a block pulse generator circuit 11, a series coupled photo-diode array driving circuit 12, a photoelectric converter circuit 13 using photo-diode arrays, a binary encoder circuit 14, a sampling circuit 15, a series-parallel converter circuit 16, and a data processor circuit 17. The driving circuit 12 is responsive to a clock pulse C derived from the clock pulse generator circuit 11 for providing to the photoelectric converter circuit 13 a signal necessary to scan the photo-diode arrays. That is, a pulse signal is supplied for operating a switching circuit including the photo-diode arrays (hereinafter referred merely to as a start pulse), and also a shift pulse for sequentially shifting the start pulse in the shift register of the photodiode arrays.

In accordance with these signals, the photodiode arrays effect self-running to generate an image signal which is turn is amplified in a current amplifier circuit, waveform-shaped in a sample and hold circuit, and supplied to the binary encoder circuit 14 which converts the analogform inputted image signal into a binary signal representing a white or block condition. The binary encoded signal is coordinated with the clock pulse in the sampling circuit 15 and then derived through the series-parallel converter circuit 16 to the data processor circuit 17. The series-parallel converter circuit 16 is used for converting the data supplied as a 1 bit unit into a parallel data as a transfer unit and may be removed depending on the structure of the data processor circuit.

Figure 4:
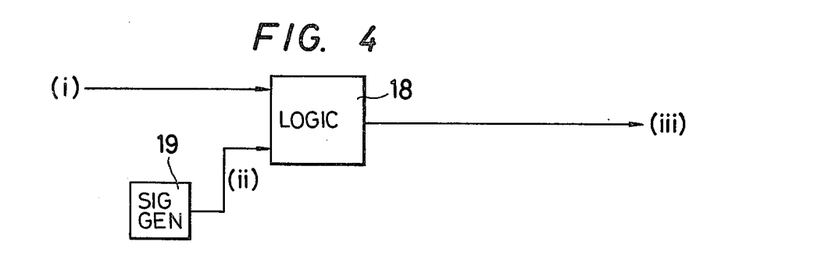
FIG. 4 is a block diagram of a basic embodiment illustrating the operation of this invention.

FIG. 4 is a block diagram of a data processing circuit according to one embodiment the present invention. A picture signal (i) incoming through a signal line is fed as an input to a logic circuit 18, in which picture signal (i) and a scramble signal (ii) generated from a signal generating circuit 19 are subjected to an Exclusive OR operation. The result is provided as converted picture signals (iii) as outputs.

Figure 5:
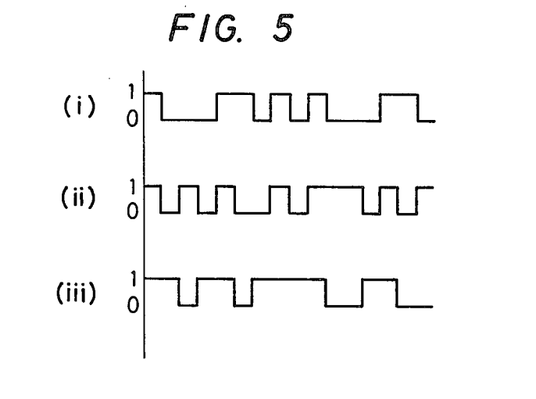
FIG. 5 is a time chart of the operation of the FIG. 4 block diagram.
Figure 6:
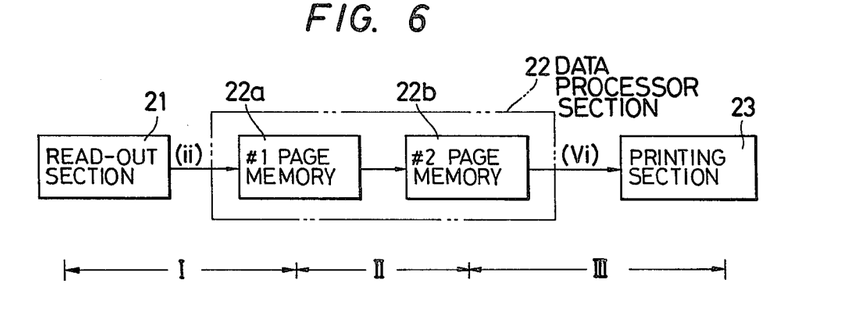
FIG. 6 is a block diagram used to explain the operation of the present invention.
Figure 7:
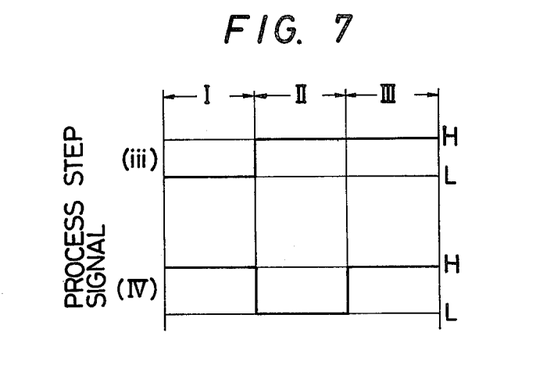
FIG. 7 is control signal waveforms.

FIG. 5 is a time chart for explaining the aforesaid converting operation, wherein (i) represents an input picture signal, (ii) represents a scramble signal generated by signal generating circuit 19, and (iii) represents a converted image signal according to the present invention. The converted picture signal (iii) is an exclusive logical sum of the signal (i) and signal (ii). The signal (i) is also an exclusive logical sum of the signal (ii) and signal (iii). This is established by the following logical expression:

$$(A \oplus B) \oplus B = (A\bar{B} + \bar{A}B) \cdot \bar{B} + \overline{(A\bar{B} + \bar{A}B)} \cdot B$$
$$= A\bar{B}\bar{B} + \bar{A}B\bar{B} + \overline{(\bar{A} + \bar{B})} \cdot B$$
$$= A\bar{B} + (A\bar{A} + \overline{AB} + BA + B\bar{B}) \cdot B$$
$$= A\bar{B} + AB + A(B + \bar{B}) = A$$

wherein the encircled sign $\oplus$ is an operational symbol representing the exclusive logical sum. The above logical expression represents that the exclusive logical sum of the exclusive logical sum of A and B, and B and A. From this, it is seen that when it is desired to reproduce an original image from an image recording by conversion of the original image by using the device of the present invention, the device and the procedure are quite the same as those used in conversion of the original image may be utilized. The aforesaid scramble signal may be of a desired shape, and preferably of a periodical form. For example, an image zone is divided into a checker pattern, and "1" and "0" are assigned to block portions and white portions, respectively, (these numerals may be reversed). In this connection, a size of a unit block or white portion should be selected in the range of ⅓ to 1/5 of a signal character to be recorded. FIG. 6 is a block diagram used to explain the operation of the present invention, and FIG. 7 shows control signal waveforms. In the present invention, the original document is considered as a combination of segments divided in rectangular form and the image is converted or encoded by replacing the segments in accordance with a proper rule and is reproduced by decoding them. In FIG. 6, the reference numeral 21 indicates a read-out section, numeral 22 a data processor section, and the numeral 23 a printer section. First and second page memories are provided in the data processor section 22, each having a capacity sufficient to store at least one page of the original document. The operation of the apparatus includes three steps of:

(1) converting in the read-out section 21 the image information of the original document into binary coded electric signals and storing the converted original document image information sequentially in the first page memory 22a of the data processor section 22, (2) upon shifting the image information stored in the first page memory 22a into the second page memory 22b shifting the data between the first and second page memories of the data processor section 22 such that the arrangement of the image information to be stored into the second page page memory is equal to that of the divided segments of the original document replaced in accordance with a predetermined rule, and (3) sequentially reading out the image information stored in the second page memory of the data processor section and supplying it to the printer section 23 for printing on a recording medium such as a paper sheet.

The predetermined rule referred therein may be determined in the following manner: The order converted with respect to order $x \times 1, 2, 3, \ldots, n$, is expressed by $$\epsilon = px \pmod{q}$$

where p and q are prime numbers with respect to each other. For example, assuming in equation (1) that $x=1, 2, \ldots, 10$, $p=3$, and $q=11$,

| when x = 1, | ε = 3.1 | (mod 11) = 3 |
| x = 2, | ε = 3.2 | (mod 11) = 6 |
| x = 3, | ε = 3.3 | (mod 11) = 9 |
| x = 4, | ε = 3.4 | (mod 11) = 1 |
| x = 5, | ε = 3.5 | (mod 11) = 4 |
| x = 6, | ε = 3.6 | (mod 11) = 7 |
| x = 7, | ε = 3.7 | (mod 11) = 10 |
| x = 8, | ε = 3.8 | (mod 11) = 2 |
| x = 9, | ε = 3.9 | (mod 11) = 5 |
| x = 10, | ε = 3.10 | (mod 11) = 8 | and, a converted order $\epsilon = 3, 6, 9, 1, 4, 7, 10, 2, 5$, and 8 is obtained.

Figure 8:
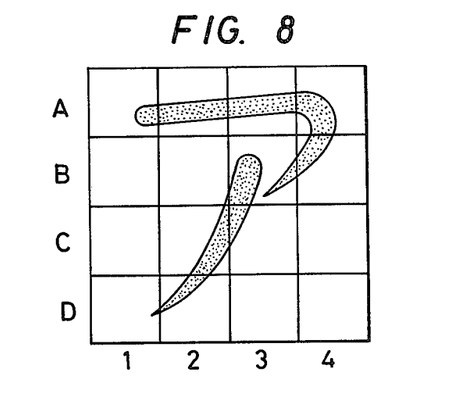
FIGS. 8, 9, 11 and 15 show schematically the replacement of image information made in accordance with one embodiment of the present invention.
Figure 9:
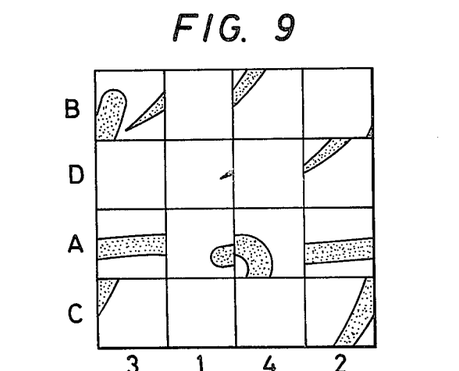

FIGS. 8 and 9 schematically show an image information replacing rule made in accordance with the present invention in which the original document of FIG. 8 is composed of 16 rectangular segments and is replaced in a predetermined order to be recorded as a converted image as shown in FIG. 9. As can be seen, it is impossible to presume the original image (?) from the converted image of FIG. 9. In reproducing the original image from the converted image, the operation may be made in the reversed order by taking the converted image of FIG. 9 as a new original image.

Figure 10:
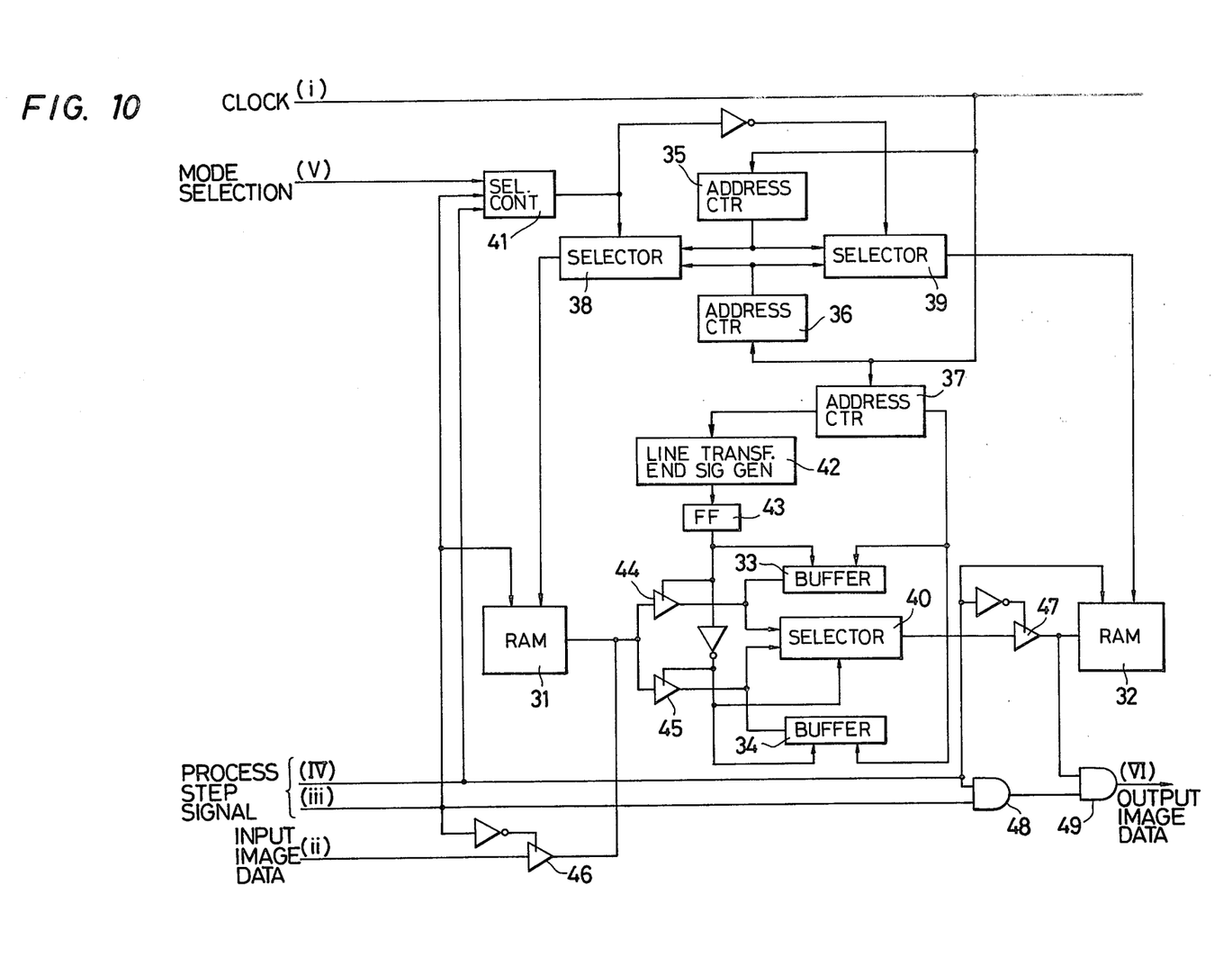
FIGS. 10, 13 and 16 show the structure of a data processor section of the present invention.

FIG. 10 is a block diagram showing the detailed structure of the data processor section 22 of FIG. 6. The data processor section 22 includes a first page memory 31 and a second page memory 32. The first and second page memories 31 and 32 are random access memories (RAM) having a capacity sufficient to store at least one page of the information. Also shown in FIG. 10 are selectors 38 to 40, a control circuit 41 for generating a signal indicating that one line of image information has been transferred to the buffer memory 33 or 34 from the RAM 31 (hereinafter referred to as line transfer end signal), a flip-flop 43, and gates 44 to 49. The letter (i) on the signal line at the upper left hand portion of the Figure indicates a clock pulse, the letter (ii) at the lower left corner an input image data derived from the read-out section, the letters (iii) and (iv) signals such as, for example, those shown in FIG. 7 and indicating which one of the operation steps 1 to 3 the apparatus operates in, and the letter (v) a mode selection signal for selecting the operation between image conversion and image reproduction which is inputted from the exterior of the apparatus by suitable means. The operation of the data processor section in first, second and third steps will be described.

FIRST STEP

The signal (iii) renders the RAM 31 writable and the gate 46 opens so that the image data (ii) inputted from the read-out section is written in the address specified by the address counter 35. The address counter 35 is adapted to advance an address in response to each clock pulse (i) and specify the address of the RAM 31 through the selector 38 in the first step. In the first step, the signal (iv) renders the RAM unwritable and the gate 47 is closed. Also, the signal (iii) closed the gates 48 and 49. The first step terminates when the image data of one page of the original document is completely stored in the RAM 31.

SECOND STEP

The signals (iii) and (iv) render the RAM 31 unwritable (or readable), the RAM 32 writable, and the gate 47 open so that the image data from the buffer memory 33 or 34 can be supplied into the RAM 32. At this time, the gates 46, 48 and 49 are closed. The address specifying the RAM 31 is accomplished by either of the address counters 35 and 36 and the address specifying the RAM 32 is accomplished by the other address counter in accordance with the mode selection signal (v). For example, the selector control circuit 41 controls the selectors 38 and 39 to permit the address counter 35 to define the address of the RAM 31 and the address counter 36 to define the address of the RAM 32 upon coding, and vica versa upon decoding. The address counter 36 is adapted to change the address in accordance with a predetermined rule each time a clock pulse (i) is applied thereto. The order of address defining of the RAM 31 or 32 is determined by specifying the rule for replacing the rectangular segments such as the one expressed in equation (1).

Figure 11:
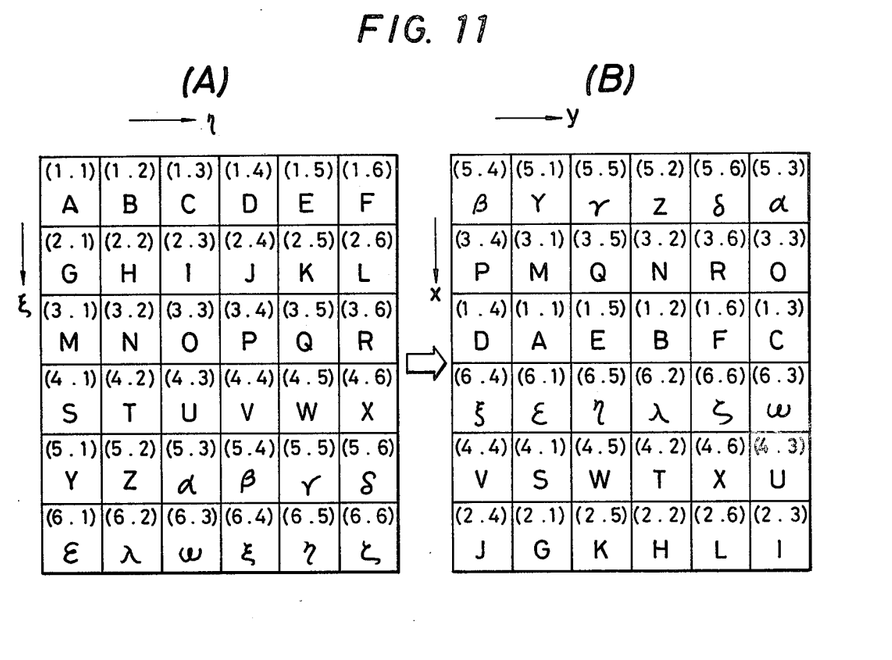

FIG. 11 shows that the original image A divided into 36 rectangular blocks can be converted into a coded image B by replacing them in accordance with the rule given by equation (1). A block placed at a position ($\epsilon$, $\eta$) of the original image A is transferred into a position (x, y) of the converted image B. In other words, the block to be transferred into the position (x, y) of the converted image B is located at the position ($\epsilon$, $\eta$) of the original image A and the relationship between these positions are given by:

$$\epsilon = p1x \pmod{q1}; \text{ where } p1 \text{ and } p2 \text{ are prime.}$$
$$\eta = p2x \pmod{q2}; \text{ where } p2 \text{ and } q2 \text{ are prime.}$$
$$x = 1, 2, 3, \ldots, m$$
$$y = 1, 2, \ldots, n$$
$$= 1, 2, 3, \ldots, m$$
$$= 1, 2, 3, \ldots, n$$

where $m=n=6$, $ok=5$, $p2=11$, and $q1=q2=7$.

Figure 12:
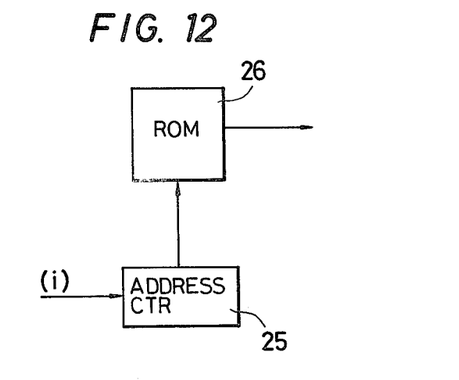
FIG. 12 shows an address counter used in the present invention.

In order to accomplish such address defining, the address counters 35 and 36 of FIG. 10 may be composed of an address counter 25 and a ROM 26 so that the address data can be stored in the ROM 26 in accordance with the above conversion rule as shown in FIG. 12.

When the counter 25 sequentially defines the addresses in the ROM 26 in response to the clock pulses C, the data stored in the addresses or the address defining signals of the RAMs 31 and 32 of FIG. 10 are sequentially read out and the image signals are read and written in a predetermined order. The addresses are defined by the address counter 35 upon converting or coding the original image or defined by the address counter 36 upon decoding so that one line of the image data read out from the RAM 31 is written in the buffer memory 33 or 34 specified by the flip-flop 43. Simultaneously, the image data written in the RAM 31 is sequentially read out and transferred through the other buffer memory into the RAM 32.

At this time, the buffer memories 33 and 34 are address-defined by the address counter 37. When the address counter 37 defines the final address of the buffer memories 33 and 34, a line transfer end signal is provided from the line transfer end signal generator circuit 42 which inverses the output of the flip-flop 43. This causes the buffer memories 33, 34 to change from the writable state to the unwritable state or from the unwritable state to the writable state. Simultaneously, the image data from the RAM 31 is applied to the buffer memory changed to the writable state to change the conditions of the gates 44 and 45. The states of the respective buffer memories are inverted each time one line of image data is transferred. Simultaneously, the selector 44 inverses the connection such that the image data read from the buffer memory changed to the unwritable state can be transferred into the RAM 32.

The address defining for the image data transferred into the RAM 32 is accomplished by either of the address counters 35 and 36. The selection of the address counters is effectuated by the selector 39. That is, the selector 39 operates to cause the address counter 36 to define the address of the RAM 32 upon original image conversion or coding and the address counter 35 to define the address of the RAM 32 upon reproduction. The selector 39 is controlled by the selector control circuit 41. The second step terminates when the image data stored in the RAM 31 is completely transferred into the RAM 32 in accordance with the above rule.

THIRD STEP

In the third step, the RAM 32 is rendered unwritable or readable and the gates 48 and 49 are opened so that the image data (vi) read from the RAM is supplied to the record section 23. At this time, the address defining of the RAM is accomplished by the address counter 35. Thus, the image data stored in the RAM 32 is sequentially supplied to the recorded section and rendered visible by suitable recording or indicating means.

Although an image divided into rectangular segments is replaced in the above embodiment, the conversion of the image may be made by replacing the order of scanning. By properly selecting the range in which the replacement is effectuated and the number of unit scanning lines, it is possible to eliminate memories having a large capacity and reduce the operation time.

Figure 13:
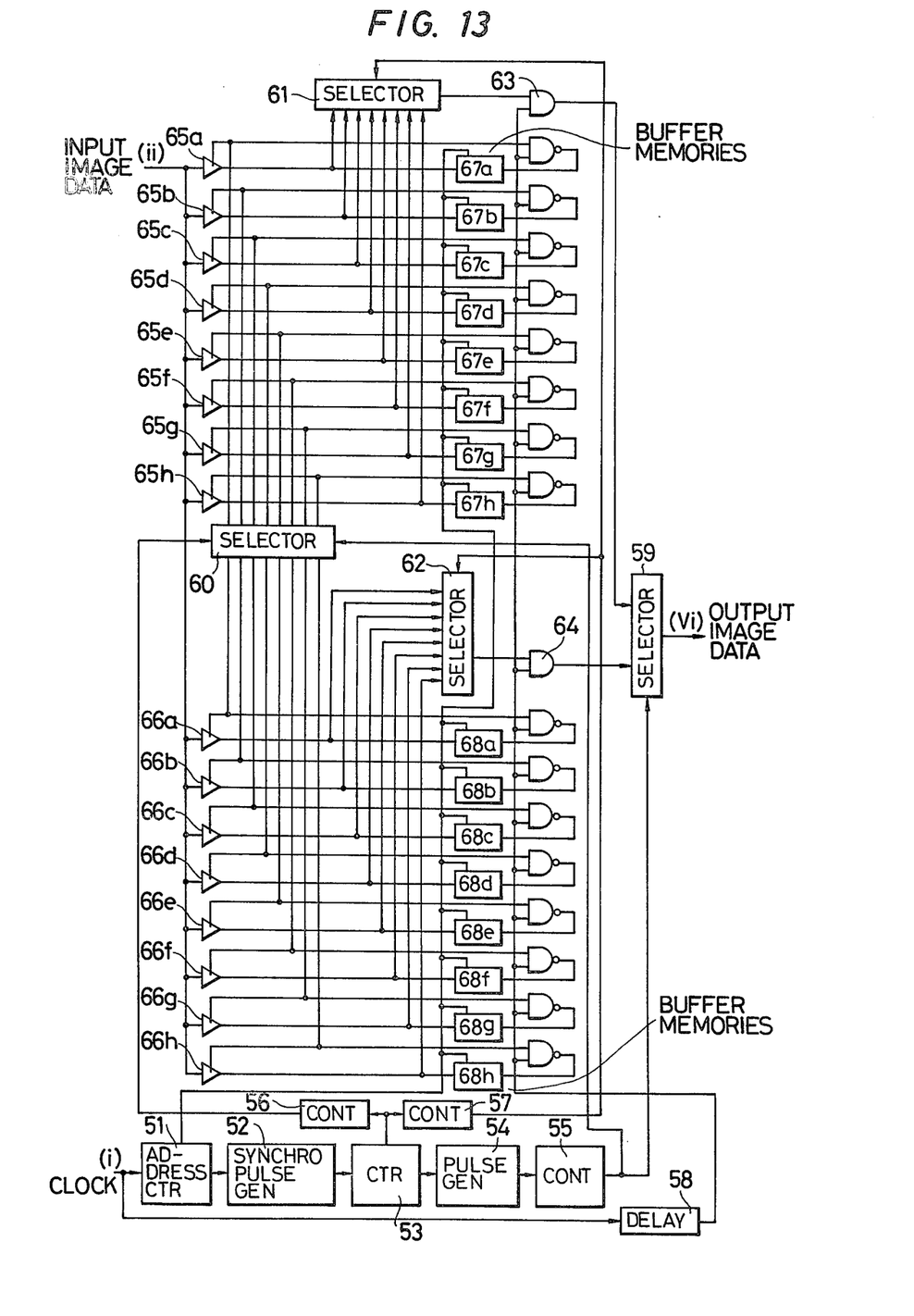

FIG. 13 is a block diagram showing a data processor section for converting an image in a scanning line order replacing manner. In this embodiment, the conversion of the image is accomplished by properly replacing continuous 8 scanning lines in a group. In FIG. 13, the letter (i) indicates clock pulses, (ii) image data supplied from the read-out section, and (vi) image data converted in the data processor section. The reference numeral 51 designates an address counter set to define the first address before the image data on the respective scanning lines are inputted or outputted from the data processor section and to sequentially define the addresses of one-line buffer memories 67a to 67h and 68a to 68h each time a clock pulse is applied thereto.

A synchronizing pulse generator 52 provides a pulse each time one line of image data is inputted or outputted from the data processor section. A counter 53 is employed for counting the synchronizing pulses and is reset each time it counts n (8 in this embodiment) pulses. A pulse generator 54 provides a pulse each time an image corresponding to n (8 in this embodiment) scanning lines is inputted or outputted from the data processor section. A selector control circuit 55 includes a flip-flop for inverting its output each time a pulse is generated from the pulse generator 54 to control selectors 59 and 60. A selector control circuit 56 is utilized for controlling the selector 60 such that the buffer memories 67a to 67h or 68a to 68h can be rendered writable in the order from a in response to the output of the counter 53.

A selector control circuit 57 controls selectors 61 and 62 such that either of the buffer memories 67a to 67h and 68a to 68h to be read out in accordance with the output of the counter 53 can be selected in a proper order. Also shown in FIG. 13 are a delay circuit 58, gates 63 and 64, and gates 19a to 19h and 20a to 20h.

The image data transferred from the read-out section are first stored in the buffer memories 67a to 67h and 68a to 68h such that the respective scanning lines of the image data transferred from the read-out section are written in the buffer memories a to h in one group and the image data are read from the buffer memories a to h in the other group and transferred into the record section. The writable and readable conditions of the two buffer memory groups are alternatively changed each time the image data corresponding to 8 scanning lines are inputted and outputted from the data process section. This operation is repeated for converting and reproducing the image.

Assuming now that the image data (ii) transferred from the read-out section is written in the buffer memories 67a to 67h in one group, the selector 60 is controlled to define in the order from a to h by the selector control circuit 56. The address defining in the respective buffer memories are accomplished by the address counter 51. At this time, the data stored in the addresses of the buffer memories 68a to 68h defined by the address counter 51 are sequentially read out and supplied to the selector 62. The selector 62 selects some of the data read from the respective buffer memories 68a to 68h specified by the selector control circuit 57 and supplies them to the selector 59. The selector control circuit 57 defines the buffer memories 68a to 68h in a predetermined order different from that specified by the selector control circuit 56.

For example, the selector 60 selects the buffer memories in the group specified by the selector control circuit 55 (in this example, the one group) in the order a, b, c, d, e, f, g, and h in accordance with the command of the selector control circuit 56, while the selectors 61 and 62 select the buffer memories in the order d, g, c, h, a, f, b, e, or e, f, g, h, a, b, c, d in accordance with the selector control circuit 57. The selector 59 selects and transfers the data from the selector 62. (under this assumption) into the record section under the control of the selector control circuit 55. When 8 scanning lines of data have been transferred, the conditions of the buffer memories in the first and second groups are inverted. In such a manner, the image data from the read-out section is converted such that replacement takes place in continuous 8 scanning lines and is outputted as an image data (v) from the selector 59. Thereby, a converted or coded image is obtained.

Figure 14:
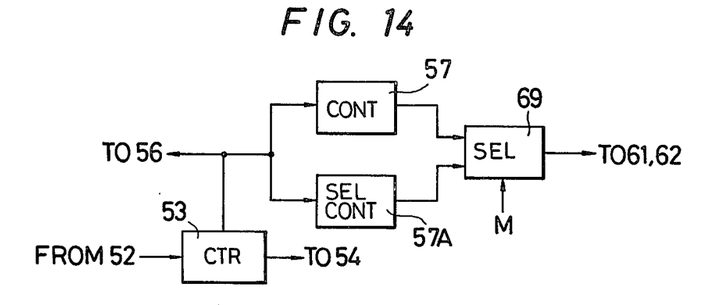
FIG. 14 is a block diagram showing an example of a conversion mode changing circuit.

FIG. 14 is a block diagram showing a means for switching the apparatus of FIG. 13 between the converting or coding mode and the reproducing mode. Like reference numerals have been applied to FIG. 14 with respect to the equivalent components shown in FIG. 13. Reference numeral 57A indicates a selector control circuit, a selector 69 selects the signal from the control circuit 57 under the conversion mode in accordance with a mode specifying signal applied from the exterior, the above image converting operation is accomplished. On the other hand, the selector 69 selects the signal from the control circuit 57A to control the selectors 61 and 62 for reproducting operation under the reproduction mode.

Figure 15:
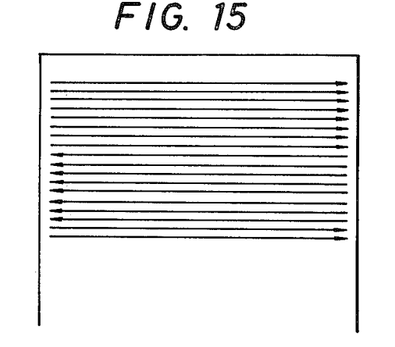
Figure 16:
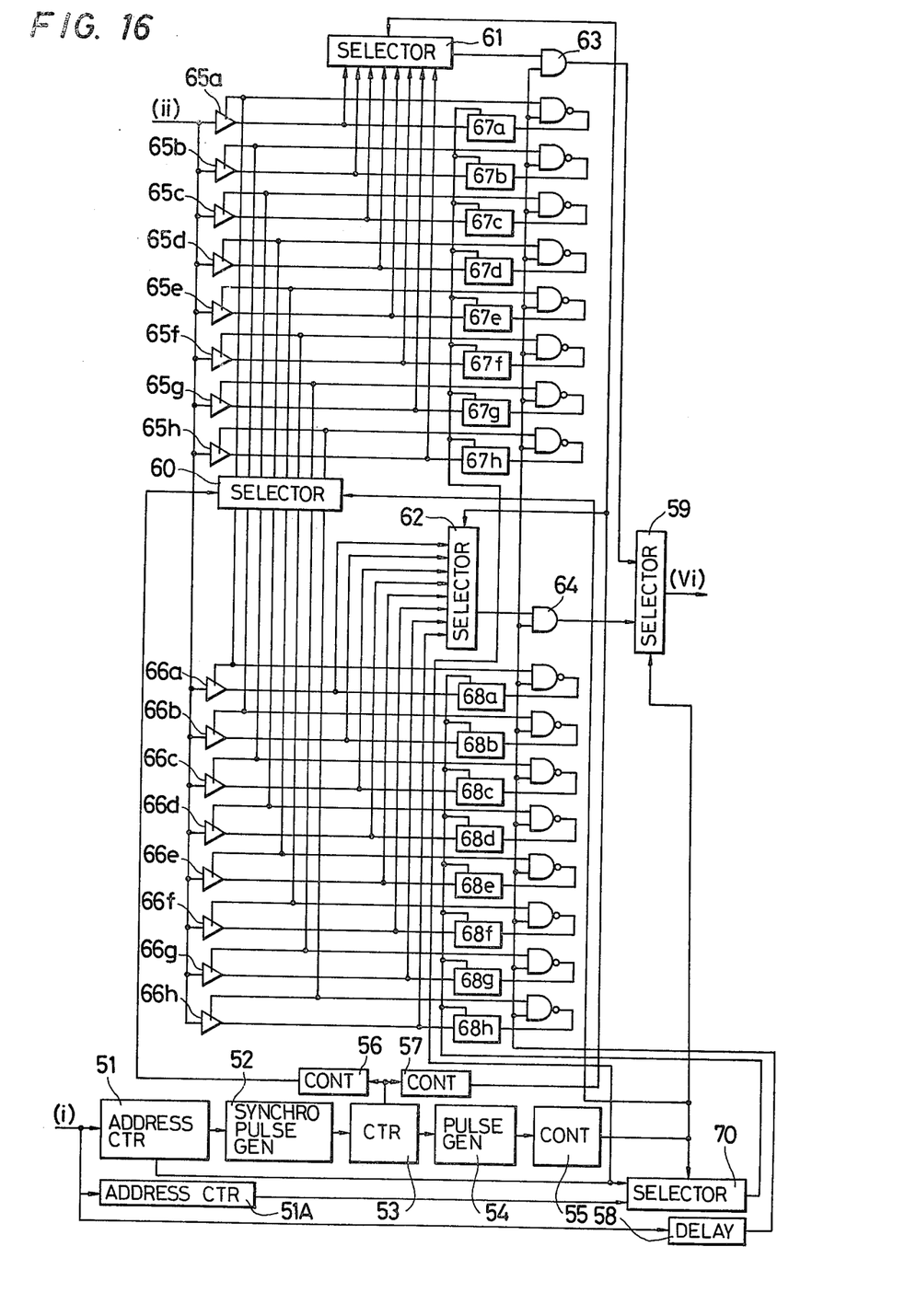

More complex conversion is possible by inverting the scanning direction for every n lines and replacing the order of the scanning lines for n scanning lines. FIG. 15 schematically shows such conversion. FIG. 16 is a block diagram of a data processor section for this purpose. This embodiment is similar to FIG. 13, but as can be seen by comparison with FIG. 13, this embodiment further includes an address counter 51A for defining the addresses of the buffer memories 68a to 68h in the reverse order from the last to the first. It also includes a selector 70 for selecting the address counter such that the address counter 51A address-defines the buffer memories 68a to 68h only when the data stored in the buffer memories in the second group is read out and transferred into the record section under the control of the selector control circuit 55. It is to be noted that the scanning direction only may be inverted without replacing the order in the scanning line group. Although the order is replaced as one scanning line unit in FIGS. 13 and 16 embodiment, the order can be replaced as several scanning line unit in this arrangement. For example, if the order specified by the selector control circuit is c, d, a, b, g, h, e, f, replacement is effected for every two-scanning line unit. If the order is, e, f, g, h, a, b, c, d, replacement is effected for every four scanning line unit.

As can be seen from the foregoing, the image converting apparatus of the present invention is not for processing an original document image for every one bit, but for replacing if for on a temporary basis and as a spatially continuous plural bit block unit. Thus, it is possible to process an image at a higher speed with higher quality and low noise.

Figure 17:
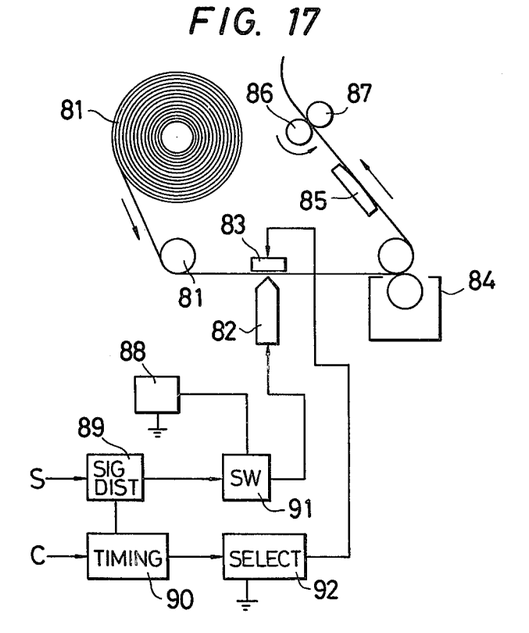
FIG. 17 is a block diagram showing an example of an image recording apparatus.

FIG. 17 shows a conventional electrostatic recording apparatus for recording the image represented by the image signals on a recording paper sheet. The image signal S and the clock pulse C supplied from the data processor section are fed into a signal distributing circuit 89 and a timing control circuit 90, respectively. The signal distributing circuit 89 distributes image signals sequentially inputted into electrodes constituting a multi-stylus head or an electrode group composed of two or more electrodes connected to each other. The timing control is effected by a clock pulse derived from the timing control circuit 90. The image signals distributed to the respective electrodes or the respective electrode groups by the signal distributing circuit 89 are supplied to a high voltage switching circuit 91 so that high voltages are generated on the respective electrodes or the respective electrode groups in accordance with the image signals.

Figure 18:
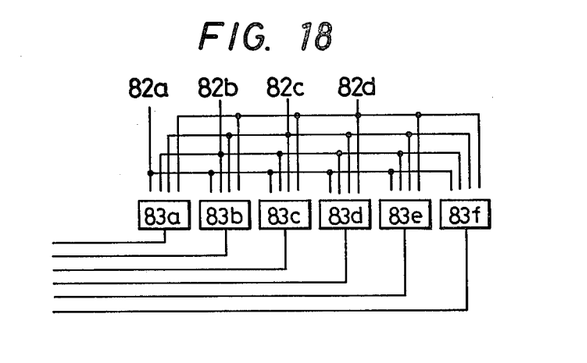
FIG. 18 is a circuit diagram showing an example of electrode connection.

On the other hand, the timing control circuit 90 supplies a timing signal to an electrode selecting circuit 92 for selecting a counter electrode 83a to be grounded each time a signal is applied to the electrode selecting circuit 92. Thus, if a high voltage is applied across the selected counter electrode and any of the electrodes facing the counter electrode, a high voltage will be generated between the electrode and the counter electrode. For example, with an arrangement having multi-stylus head 82 and counter electrodes 83 arranged as shown in FIG. 18, the signal distributing circuit 89 distributes image signals S to the electrode groups 82a, 82b, . . . in this order each time the timing control circuit 90 provides a clock pulse.

Simultaneously, the timing control circuit 90 selects the counter electrodes 83a, 83b, . . . , 83f in this order each time it supplies 4 clock pulses to the signal distributing circuit 89 to connect the selected counter electrode to ground. A high voltage is applied to the multi-stylus electrode group in accordance with the image signal. Thus, the electrodes constituting the multi-stylus head are scanned from left to right so that a voltage corresponding to the image signal is generated between the counter electrode and the electrode facing to the counter electrode. On the other hand, a recording paper sheet 81 is fed by the rollers 86 and 87 in the direction of the arrow. When the recording sheet passes between the multi-stylus head 82 and the counter electrodes 83, charges corresponding to the white and black binary level of the image signals are placed on the surface of the recording paper sheet 81 by the both electrodes to form an electrostatic latent image. The image is then developed by a magnetic brush developing unit 84 to form a colored particle image and thermal-fixed by a fixing unit 85 to form a stable and visible image.

Figure 19:
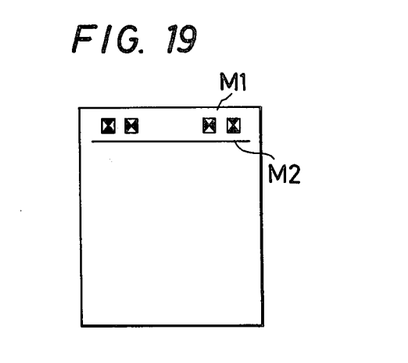
FIG. 19 is a view showing an example of reference marks.

It is required to completely meet the read scanning made upon reproducing the recorded image in the above manner with that made upon converting the original image. For this purpose, marks and a reference line as shown in FIG. 19 are recorded on the recording sheet at the same time of or before the image recording to position the original image upon reproduction.

Referring now to FIG. 20, the principle of image conversion according a modification to the present invention is shown. FIG. 20(A) schematically shows picture lines in reading an original image. The starting points of main scanning of picture lines are arranged in a straight line perpendicular to the scanning direction. FIG. 20(B) shows a schematic view illustrating one of the examples of the condition of the picture lines in recording, according to this invention wherein electric image signals obtained upon reading the picture lines have a phase of each picture line that is shifted with each other. In this illustrated case, the phase shift in each neighbouring picture line is made constant and the degree of the shift is adjusted to form one period per every m of image lines. Thus, the recorded and converted image of a line $L_1$ located perpendicularly to the main scanning direction is in a zigzag pattern $L_2$ as shown in FIG. 20(C). Of course, the phase shift between each of the neighbouring picture lines need not be the same, i.e. it may be optionally determined at random. FIG. 20(D) shows an example of such a case. The line $L_1$ is recorded, after conversion, as a curve $L_3$.

In order to restore and reproduce the thus recorded image $L_2$ or $L_3$, it is sufficient to shift the phase in a strictly inverse manner.

Figure 20B:
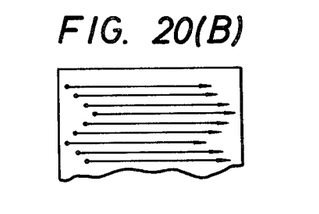
Figure 20C:
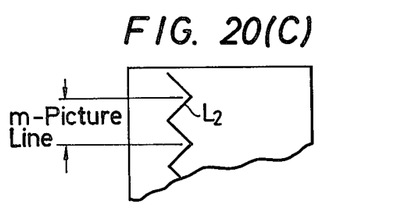
Figure 21:
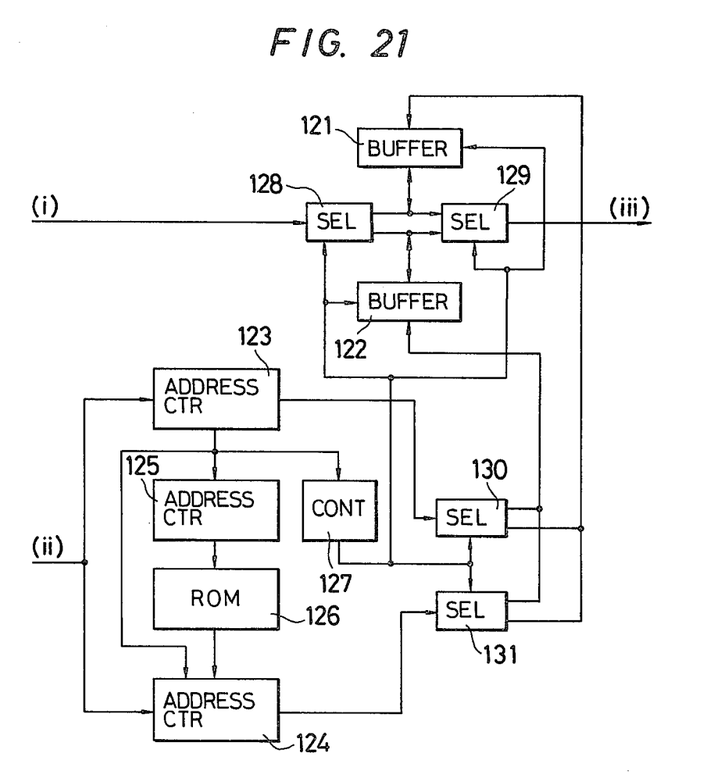
FIG. 21 is a block diagram of a modified embodiment of this invention.

FIG. 21 is a block diagram showing a modified embodiment of the invention. In this illustrated case, for convenience of explanation, one picture line is assumed to be composed of n of picture elements, the phase shift magnitude between each of the neighbouring picture lines to be equal with each other likewise in FIGS. 20(B), 20(C), and the degree of the phase shift is assumed to be periodical with every m of the picture lines. Further, though explanation is given below under the assumption that an information is binary, it is not essential. In FIG. 21, indicated as 121 and 122 are n bit buffer memories for the binary memory corresponding to n of picture elements of one picture line. Elements 123 and 124 are address counters defining address of the buffer memories 121 and 122, and elements 128-131 are selectors. A control circuit 127 is used for instructing a read/write mode for the buffer memories and connection condition of each of the selectors. A read-only-memory 126 (ROM), and an address counter 125 for defining address of the ROM are shown in FIG. 21.

When time series image data (i) supplied as input into the afore-mentioned signal processing means are written in either one of the buffer memories 121 and 122 alternately for each picture line, image data stored, just before, in the other one of the buffer memories are simultaneously read out. Read and write mode in the buffer memories is inversed every time when input and output for the n data of one picture line are completed. The selector 128 for selecting a buffer memory in which the data (i) supplied thereto as an input are written (stored). On the other hand, reference numeral 129 indicates a selector for selecting a buffer memory from which the stored data are read out. The selector 129 is arranged to select the buffer memory which is different from the selected by the selector 128.

Addressing of the buffer memories 121, 122 is made by the address counters 123, 124. The address counter 123 is adapted for addressing the buffer memory in which the image data (i) are written and which defines address of buffer memory for each picture line from 0 to n−1 in order. The address counter 124 is adapted for reading out the data of each picture line from buffer memory and is arranged to read out the data from the address defined, in every picture line, by the ROM 126. In the ROM 126, m of address data $a_k$ ($a_k$ is an integer of 0, ..., n−1; and k=0, 1, ..., m−1) are memorized. When reading out from the buffer memory selected by the selector 129, the data $a_k$ stored in the address k defined by the address counter 125 is first read out as an initial value of the address counter 124. Accordingly, from the buffer memory n of data are successively read out in the following order:

$$a_k, a_{k+1}, \ldots, n-1, 0, 1, 2, \ldots, a_{k-1}.$$

Thus, image data or picture signals (iii) are fed via selector 129 to a recording section (not shown) with their phase shifted by n−$a_k$ picture elements. Assuming that the address counter 125 defines successively addresses of 0, 1, 2, ..., prior to reading out, then image data having the phase shifted by the same number of the picture elements will be produced every m of the picture lines.

The two address counters 123, 124 constituted as described above conduct addressing of the buffer memories 121, 122 via selectors 130, 131. That is, the address counter 123 is adapted for addressing via the selector 130 the buffer memory in which the data is written, while the address counter 124 is adapted for addressing via the selector 131, the buffer memory from which the data is read out. The selector control circuit 127 controls so that each of the selectors 128-131 can perform the series of the operations as described above. Furthermore, the selector control circuit 127 is adapted for selecting the read/write mode of the buffer memories 121, 122. The selector control circuit 127 is composed of a flip-flop circuit and inverts the connection of the selectors 128-131 and the read/write mode of the buffer memories 121, 122 every time when the address counter counts n of clock pulses (ii), i.e. when the circuit 127 receives a pulse generated every time when n of the image data for one picture line are inputted in or outputted from the above mentioned data processing section.

Figure 20A:
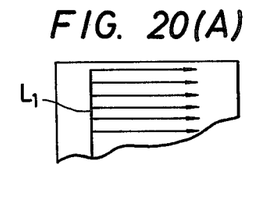
FIGS. 20A–D are schematic drawings showing modified modes of operation of this invention.
Figure 20D:
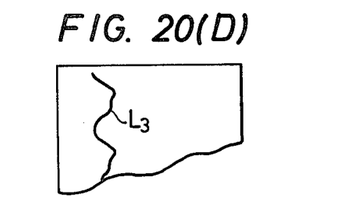

Through the foregoing operations, each picture line read out as FIG. 20(A) is converted for recordation as FIG. 20(B). Therefore, the recorded image is materially different from the original image and cannot be in itself readable or understood.

Restoration and reproduction of the thus obtained converted image can be also effected with the system of FIG. 21. In converting the original image, address counters 123, 124 are controlled so that the counter 123 defines the address of the buffer memory in which the input image data (i) are written while the counter 124 defines address of the buffer memory from which the data is read out. In case of restoration and reproduction, this is reversed, i.e. the address counter 123 defines the address of the buffer memory from which data are read out and the address counter 124 defines the address of the buffer memory in which the data (i) is written. For this purpose, it is sufficient to suitably arrange the selector control circuit 127 controlling selection operation of the selector 130, 131 or make the circuit 127 switchable.

In the above explanation, the address counter 124 is described to be initially set to a value indicated by the address data read out from ROM 126 in addressing the buffer memory. Accordingly, though the magnitude of phase shift in each picture line is periodic, the phase shift is variable depending upon the memory in the ROM 126 and may be optionally determined for each picture line. In case where the phase shift of a picture line relative to its preceding line is always kept constant in every single period (as is the case of FIG. 20(C)), ROM 126 need not be used. Rather, an indicated value k by the address counter 125 may be directly inputted to the address counter 124 to set the initial value thereof to the value k. In this case, it is desirable that the address counter 125 may either increase or decrease the indication value by several to ten or more numbers for inputted pulse train and, at the same time, may be controlled to conduct such operations periodically.

As can be seen from the foregoing, the present invention reading as original document image as electric signals and processing the electric signals can print on a paper sheet a converted image materially different from the original image. Furthermore, it is possible to print the original image on a paper sheet by reading the converted image as electric signals and processing them in the order opposite made upon converting the original image. It is also possible to electrically indicate the original image without printing it on a paper sheet. The present invention is very useful for document transport and custody while keeping the contents secret.

The present invention provides the following significant advantages:

(1) Since the size of the converted image recording medium may normally be similar to that of the original documents and one-to-one correspondence is provided between the original documents and the converted image recording medium, the converted image recording medium can be transported and charged with normal documents.

(2) Since the converted image recording medium can be handled with normal documents, document care is easy even if some of original documents are converted.

(3) Since the converted image recording medium may have the same size as normal original documents, they can be placed in office supplies such as paper cabinets, briefcases, file cabinets, office desk drawings for transport and custody.

(4) Since the converted image recording medium may have the same size as normal original documents, wide applications are possible such as converting only a part of an original document image.

(5) The apparatus of the present invention can be used also as a copier. Thus, it is possible to convert an image and reproduce the converted image without any special device by the apparatus of the present invention.

(6) Since the conversion system can be varied in various fashions depending on the difficulty in reproduction, it is very difficult for other persons to reproduce the converted image.

(7) Since the conversion system can be readily varied each time the apparatus is used, the apparatus can be used for long time.

(8) Unlike magnetic tapes, normal office paper sheets can be used as mediums and the operation required is similar to the normal copying operation. Thus, the apparatus is easy to operate without any skilled labor.

We claim:

1. In an image converting method for scanning an original image in a scanning direction to convert each picture element into a series of electric image signals and replacing the order of the electric image signals in a predetermined manner to thereby obtain a coverted image different from the original image, the improvement comprising, the steps of replacing the order of the electric image signals in corresponding signal blocks of said electric image signals, storing the electric image signals once in a memory according to the reading-scanning order, reading out the content of the memeory in another predetermined order different from that made upon storing the electric image signals in the memory to form a converted image according to the resulting series of electric image signals, and producing said converted image on a recording medium, wherein the order of the electric image signals is replaced for each group by a plurality of scannings in the direction opposite to the scanning direction.

2. The method of claim 1 wherein the converted image is recorded on a recording medium according to the resulting series of the electric image signals.

3. The method of claims 1 or 2 wherein the order of the electric image signals is replaced for each segment into which the original image is divided in lattice form.

4. The method of claims 1 or 2 wherein the order of the electric image signals is replaced for each group including a plurality of scannings.

5. The method of claims 1 or 2 wherein a reference position mark is recorded at a position predetermined with respect to the converted image on a recording medium.

6. The method of claim 1 wherein the converted image is recorded on a recording medium according to the resulting series of the electric image signals.

7. A method for converting an image, comprising the steps of scanning an original image in a scanning direction to convert the original image into electric picture signals for each picture line and, recording the image on a recording sheet while shifting the phase of each of the picture signals corresponding to said picture lines in a predetermined magnitude wherein the order of the electric picture signals is replaced for each line by a plurality of scannings in the direction opposite to the scanning direction, thereby obtaining a visual image having a different pattern from that of the original image.

8. The method as claimed in claim 7, wherein said shifting of the phase of each of the picture signals corresponding to the picture lines is conducted by the the steps of memorizing the electric picture signals in the order of the scanning for each picture line, and varying a reading out start address for each memorized image line.

9. The method as claimed in claims 7 or 8, wherein the phase of each electric picture signal is shifted in a predetermined magnitude for each of the neighbouring picture lines.

10. The method as claimed in claims 7 or 8, wherein the phase of each electric picture signal is shifted in a predetermined magnitude for groups, each including a plurality of neighbouring scanning lines.

11. The method as claimed in claims 7 or 8 further comprising the step of recording a reference position mark at a predetermined position relative to a converted image on the recording sheet.

12. A method of coverting an image comprising the steps of: scanning said image in a scanning direction, dividing an image domain into a plurality of optical, independent regions containing picture elements of the image, each region being assigned with either one of "1" and "0" of a binary signal so that a predetermined scramble signal may be prepared for all picture elements, and, obtaining exclusive OR between a binary signal obtained from an original image and a scramble signal corresponding to the picture element which is in the same coordinate position therewith; the resulting output signal being utilized for forming on a recording sheet a visual image different from the original image, wherein the order of the binary signals is replaced for each group by a plurality of scannings in the direction opposite to the scanning direction.

13. The method of claim 12, wherein the scramble signal is a periodical one.

14. An image converter as claimed in claim 13, wherein the scramble signal is in a checkered pattern.

15. The method as in claims 12, 13 or 14 wherein a reference position mark is recorded at a predetermined position relative to a converted image on the recording sheet.

16. In a system for image conversion wherein an original image is scanned to convert each picture element into a series of electric image signals and the order of said electric image signals is replaced in a predetermined manner to obtain a converted image different from the original image, the improvement comprising, image processor means to provide converted image signals different from said electric image signals, and output means for recording on a recording sheet said converted image signals, said converted image signals providing a visual image which is different from said original image, wherein the order of the electric image signals is replaced for each group by a plurality of scannings in the direction opposite to the scanning direction.

17. The system of claim 16 further comprising means to convert each picture image into a series of digital electric image signals.

18. The system of claim 17 wherein said original image is scanned by a photo-diode and said converter comprises a photo-diode drive circuit, a photoelectric converter circuit coupled to said drive circuit, a binary encoder receiving the output of said photoelectric converter, a sampling circuit and clock means for providing timing signals to said drive circuit and said sampling circuit.

19. The system of claim 18 further comprising a series-parallel converter for converting sampled data into parallel data, said series parallel converter receiving clock pulses for timing data conversion.

20. The system of claims 18 or 19 further comprising means to generate a scramble signal and logic means receiving said scramble signal and said digital electric image signals and subjecting said two signals to an Exclusive OR operation to generate said converted image signals.

21. The system of claims 16 or 17 wherein said image proessor means comprises a read-out section, a data processor section and an output section, for providing converted image signals in accordance with a mixing rule.

22. The system of claim 21 wherein said data processor section comprises a two section memory.

23. The system of claim 22 wherein each memory section is a random access memory, said data processor further comprising buffer memory means, control circuit means for generating signals indicative of data transfer from a random access memory to said buffer memory means and selector means for determining the address order of data input into said random access memory.

24. The system of claim 23 further comprising address counter means to determine the order of data transfer in said buffer memories.

25. The system of claims 16 or 17 wherein said image processor means includes means to convert said electric image signals into a converted image by reordering the order ot line scanning.

26. The system of claim 25 further comprising means to switch said image procession between a coding mode and a reproducing mode.

27. In an image converting method for scanning an original image to convert each picture element into a series of electric image signals and replacing the order of the electric image signals in a predetermined manner to thereby obtain a converted image different from the original image, the improvement comprising, the steps of replacing the order of the electric image signals in corresponding signal blocks of said electric image signals, storing the electric image signals once in a memory according to the reading-scanning order, and reading out the content of the memory in another predetermined order different from that made upon storing the electric image signals in the memory to form a converted image according to the resulting series of electric image signals wherein the order of the electric image signals is replaced for each group including by a plurality of scannings in the direction opposite to the scanning direction.

28. In an image converting method for scanning an original image to convert each picture element into a series of electric image signals and replacing the order of the electric image signals in a predetermined manner to thereby obtain a converted image different from the original image, the improvement comprising, the steps of replacing the order of the electric image signals in corresponding signal blocks of said electric image signals, storing the electric image signals once in a memory according to the reading-scanning order, and reading out the content of the memory in another predetermined order different from that made upon storing the electric image signals in the memory to form a converted image according to the resulting series of electric image signals wherein the converted image is recorded on a recording medium according to the resulting series of the electric image signals and the order of the electric image signals is replaced for each group including by a plurality of scannings in the direction opposite to the scanning direction.

* * * * *